United States Patent [19]

Karr et al.

[11] 4,325,518
[45] Apr. 20, 1982

[54] REEL SPOOL PNEUMATIC CORE CLAMP

[75] Inventors: Gerald W. Karr, South Beloit; Robert E. Page, Davis, both of Ill.

[73] Assignee: Beloit Corporation, Beloit, Wis.

[21] Appl. No.: 204,604

[22] Filed: Nov. 6, 1980

[51] Int. Cl.³ .......................................... B65H 17/02
[52] U.S. Cl. ...................................... 242/68; 403/259
[58] Field of Search ................ 242/72 B, 73, 68, 68.2, 242/68.3; 279/2 A, 8; 403/259

[56] References Cited

U.S. PATENT DOCUMENTS

| 1,961,376 | 6/1934 | McIlvried | 242/68.3 |
| 2,622,814 | 12/1952 | Benke | 242/68.3 |
| 3,276,713 | 10/1966 | Erbach | 242/68 |
| 3,703,996 | 11/1972 | Ulseth | 242/68 |
| 3,953,141 | 4/1976 | Koch | 403/259 |

*Primary Examiner*—Edward J. McCarthy

*Attorney, Agent, or Firm*—Hill, Van Santen, Steadman, Chiara & Simpson

[57] ABSTRACT

A core clamp mechanism serves to grip a core on a winder shaft by means of a plurality of ring elements and an expandable elastomer tube. A spacer sleeve abuts at one end with the free end of the core and receives, at its other end, a locking disc in preformed engagement spaces which cooperate with lugs formed on the disc. The elastomer tube is positioned upstream of the disc and supplied with air pressure for expansion of the tube against the disc which serves to compress the sleeve against the core. Shrinkage and other adjustments during the clamping operation are automatically accommodated by axial expansion of the tube under pressure. To remove a wound core, pressure is released through a valve from the tube and the disc moved clear from engagement with the sleeve. Cutouts corresponding to the disc lugs are formed on the sleeve so that, by aligning the cutouts with the disc lugs, the sleeve can be pulled off the shaft and the core removed and replaced.

14 Claims, 5 Drawing Figures

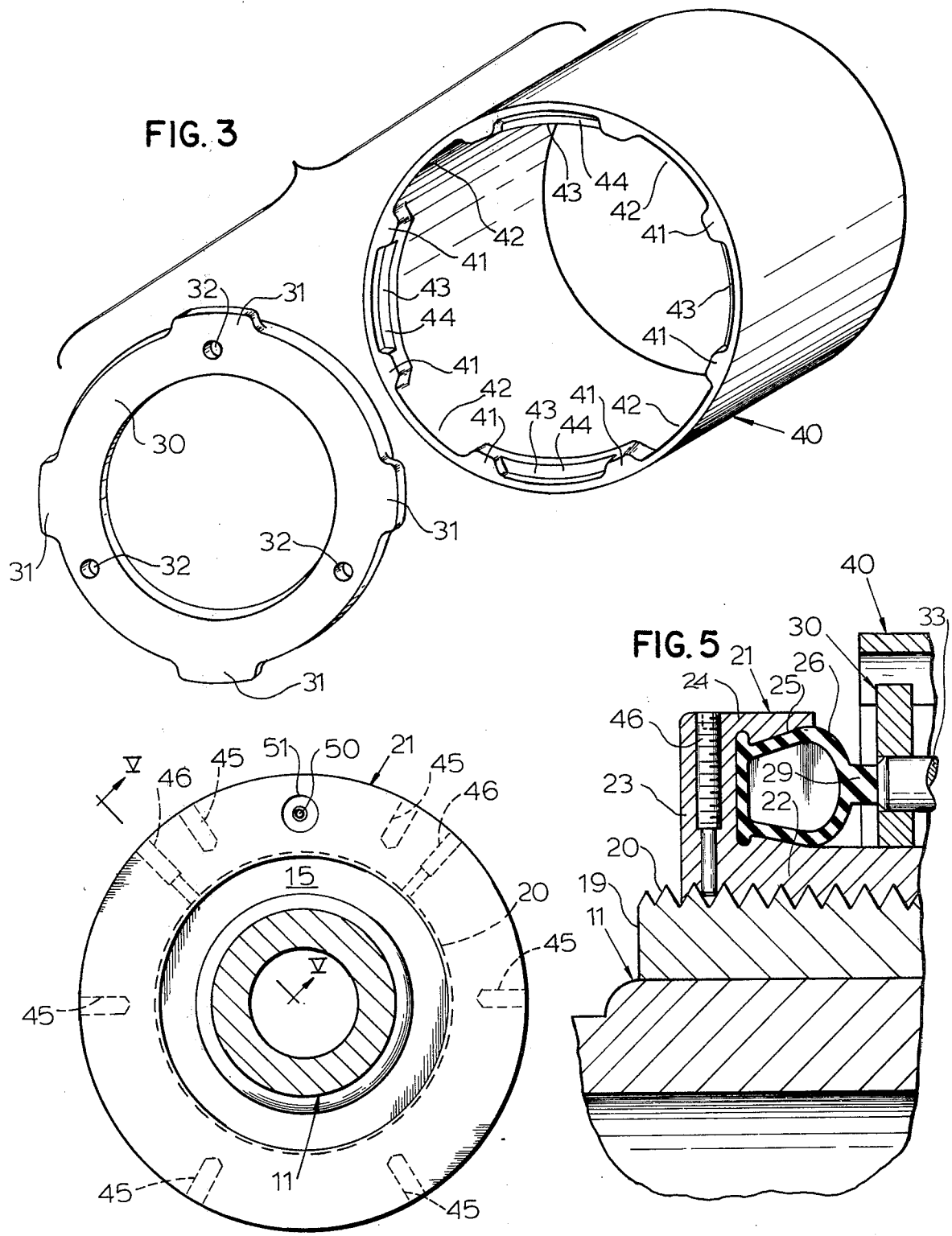

REEL SPOOL PNEUMATIC CORE CLAMP

BACKGROUND OF THE INVENTION

1. Field of the Invention

The present invention relates to a core shaft mechanism capable of supporting a hollow core on a winder shaft on which rolls of web material such as paper may be wound.

2. The Prior Art

In winding rolls of sheet of web material, such as a continuous supply of paper in a papermaking machine, it is common practice to provide a hollow tubular cylindrical core on which the paper is wound. The core requires a shaft rotatably supported at its ends to support the core during winding or unwinding operations. A core shaft clamp mechanism is necessary to grip the core in a fixed, coaxial position on the shaft and permit braking or driving of the shaft and the roll supported on the core. The clamp mechanism must also be capable of releasing its grip on the core in order to allow the core to be removed from the shaft.

Previous clamp mechanism for holding the cores on the shafts have involved heavy nuts for tightening U-shaped collars against spacer sleeves which in turn hold the core in place against a fixed flange at the opposite end of the shaft. To remove a core, the nut has to be rotated back on its threads one half inch or more until the U-shaped collar can be withdrawn from about the shaft. A fresh core is placed on the shaft followed by the spacer sleeve. The U-collar is then put in place and the nut tightened. A significant drawback with this construction is that, if cores shrink or compress, the nut can loosen, whereupon the U-collar can then be thrown radially by the rotating shaft imperiling nearby workers and machinery. Compression or shrinkage of cores may be expected particularly when paper, notably tissue paper, is being wound on fiber cores.

Another known core clamping arrangement utilizes a flexible diaphragm for radially expanding the outer diameter of the core shaft into a frictional hold engagement with the core. This construction, however, is very expensive, requiring for example the provision of air connections, and may unduly prolong the operation of mounting the core on the shaft. This mechanism is often difficult to balance the high speed operation and does not maintain reliable concentricity at higher speeds, such that undesirable variation in winding and unwinding tensions results.

The present invention avoids the drawbacks of the prior art by affording a core shaft mechanism that automatically adjusts for a continued gripping force against a core which shrinks or compresses axially during winding operation and which is relatively inexpensive to manufacture and assemble.

SUMMARY OF THE INVENTION

A core shaft mechanism for supporting a hollow tubular core on which paper is wound is made up of a set of ring-shaped elements fitted together on a core winder shaft adjacent one end of a core, the other end of the core abutting against a fixed flange on the shaft spool. The ring elements comprise a spacer sleeve for engaging a free end of the core, a locking disc for holding the sleeve against the core, and a hub carrying an inflatable elastomer tube. Air pressure is supplied to or released from the tube so that the tube surface may move, respectively, into and out of clamping engagement with the disc. The disc is circumferentially fixed about the shaft inwardly of the tube hub by means of axially biased stay pins fitted at one end in the disc and at the other end in corresponding guide holes formed in the shaft spool. Circumferentially, symmetrically spaced on the disc are a series of radially outward directed surfaces or lugs. The spacer sleeve is formed with a first set of radial recesses, open at opposed axial ends. This first set of recesses is symmetrically spaced about the sleeve to correspond with the disc lugs so that the sleeve can be passed over the disc and off the shaft to permit removal of a core. A second set of like recesses is also symmetrically interspersed with the first recesses; however, the second recesses are closed by a wall member at their rear axial ends. These second recesses correspond with the disc lugs to receive the lugs in pressed engagement at their back walls. In order to grip a core, the spacer sleeve is passed over the shaft and the lugs of the locking disc into abutting engagement with the core. The sleeve is then rotated behind the disc until the second recesses axially align with the lugs. Fluid pressure is then injected into the elastomer tube causing axial expansion of the tube against the disc, whereupon the disc positively engages with the recess back walls of the spacer sleeve so that the sleeve axially clamps the core. To remove a core, fluid pressure is relieved from the tube and the disc is biased from the spacer sleeve. The spacer is then rotated to align the first recesses with the lugs so that the sleeve can be removed from the shaft. After the sleeve has been removed, the core may be slid over the tube hub and disc and off the shaft.

BRIEF DESCRIPTION OF THE DRAWINGS

FIG. 3 is a perspective assembly view showing the lock ring and spacer sleeves for the core clamping mechanism of FIG. 1.

FIG. 4 is a cross sectional view taken along the lines IV—IV of FIG. 1.

FIG. 5 is a cross sectional view taken along the lines V—V of FIG. 4.

DESCRIPTION OF THE PREFERRED EMBODIMENT

Figure 1:
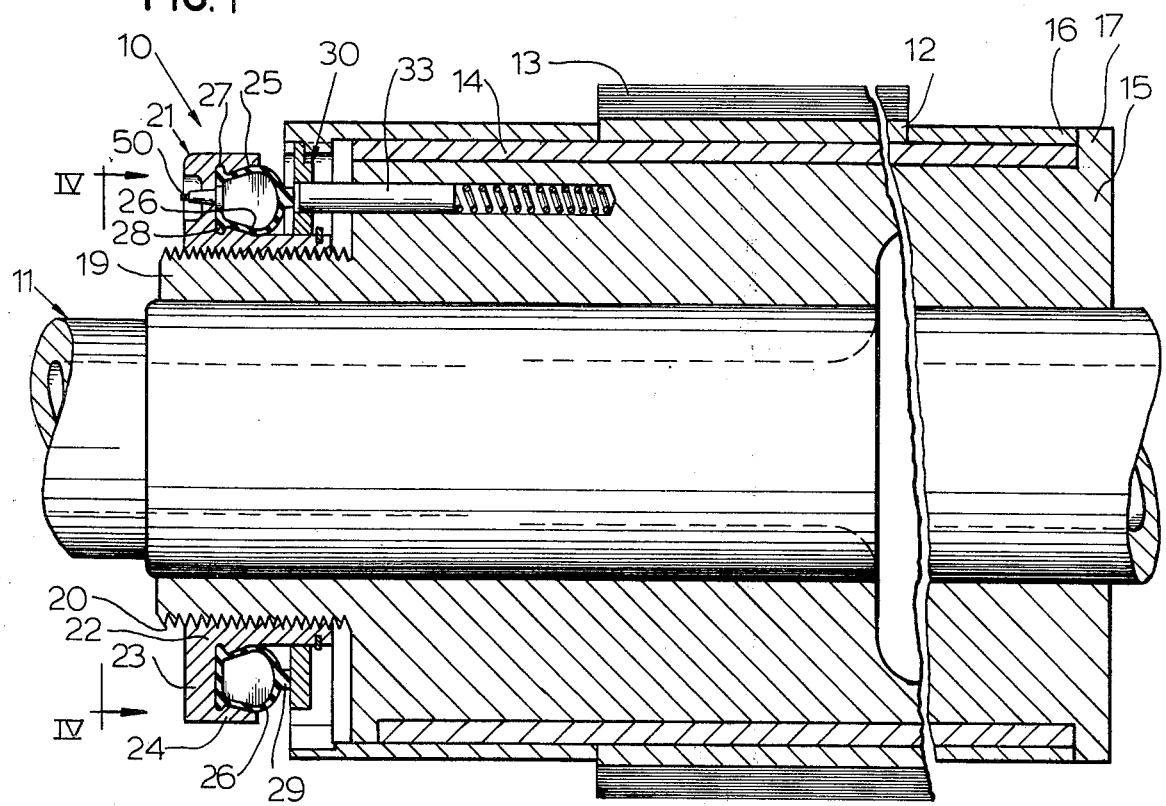
FIG. 1 is a fragmentary sectional side elevational view of a core and core clamping mechanism mounted on a winder shaft in accordance with the present invention.

FIG. 1 illustrates a core clamp mechanism 10 in accordance with the present invention in application on a winder shaft 11 capable of supporting a hollow, cylindrical core 12 for winding or unwinding a roll of sheet or web material 13 in a papermaking machine arrangement. The inner diameter of the core 12 is oversized for easy yet snug sliding relation of the core along a cylindrical mandrel surface 14 which is in fixed assembly with a shaft spool portion 15 positioned on the shaft 11 to define the winder region of the shaft.

The shaft spool 15 is formed with a raised stop flange portion 17 at the rearward axial end of the spool. A cylindrical rear spacer sleeve 16 is placed over the shaft mandrel surface 14 against the stop portion 17. When a core 12 is fit onto the mandrel 14, its rearward edge presses against the stop portion 17 through the sleeve 16. The rear sleeve 16 may have radially directed lug or notch means (not shown) permitting frictional engagement with the mandrel surface 14. The rear sleeve 16 may have radial holes (not shown) extending therethrough in communication with a vacuum pressure for the purpose of drawing paper onto the core in a manner known in the art.

At the front axial end of the spool, there is provided a relatively recessed diameter portion 19 which has threads 20 along the exterior surface thereof. The core clamp mechanism comprises a group of ring-shaped elements which fit annularly over the recessed shaft portion 19. For attachment onto the threads, there is a hub element 21 having a threaded bottom wall 22 extending axially less than the length of the spool portion threads 20. Extending radially upward from the bottom wall 22 at the front end of the hub is a side-wall 23 which is topped by an upper axial wall 24. The upper wall extends rearward and overhangs the sidewall to define therewith, between the upper and bottom walls, an annular pocket or space 25 having an open facing rearward toward the raised diameter portion of the spool. Within the pocket, there is fixably fitted an inflatable elastomer tube or bladder 26. The elastomer tube 26 is stored in its deflated condition as shown by dotted lines in FIG. 2 in order to enhance uniform and deep deflation of the tube. The tube may be positioned in the pocket by compress-fit means, such as shown by integrally formed upper and lower tube portions 27 and 28, respectively, fitting in corresponding troughs formed in hub wall surfaces. The interior volume of the tube is adapted for controlled venting and connection with a source of air pressure, such as an air hose, by means of a valve connection 50, such as an inflatable tire valve. The open end for the valve connection is positioned within a circular recess 51 formed in the front face of the sidewall 23 and extends through the sidewall into the tube. The rear portion of the tube is formed with an annular thickened region 29 having a flat open face.

The bottom wall of the hub extends axially outward from the pocket to define an annular bearing surface over which a locking disc 30 is slidably received in snug relation. With reference to FIG. 3, there are circumferentially spaced on the disc a series of lug surfaces 31 raised off of the regular diameter of the disc. A plurality of axial holes or ports extend through the surface of the disc in order to receive leading ends of stay pins 33 shown in FIGS. 1 and 2. The stay pins 33 are cylindrical rods of constant diameter slightly greater than the diameter of the lock ring ports 32 such that their leading ends force fit within the ports. The leading ends are formed with beveled tips 34 so as to provide a space for a spot weld ring 35 for connecting the pins in the ports. The welds and lead face of the pins are formed so as to present a generally flat forward-facing surface flush with the front face surface of the disc. Rearward of the disc, the pins 33 are slidably received in corresponding axially-directed channels 35 containing coil spring means 36 for biasing the pins and disc forwardly outward against the rear face region 29 of the tube. Adjacent the trail edge of the hub bottom wall 22, there is fitted an annular stop means, which may be a snap ring 37, to retain the disc on the hub during assembly of the core clamp mechanism.

Figure 2:
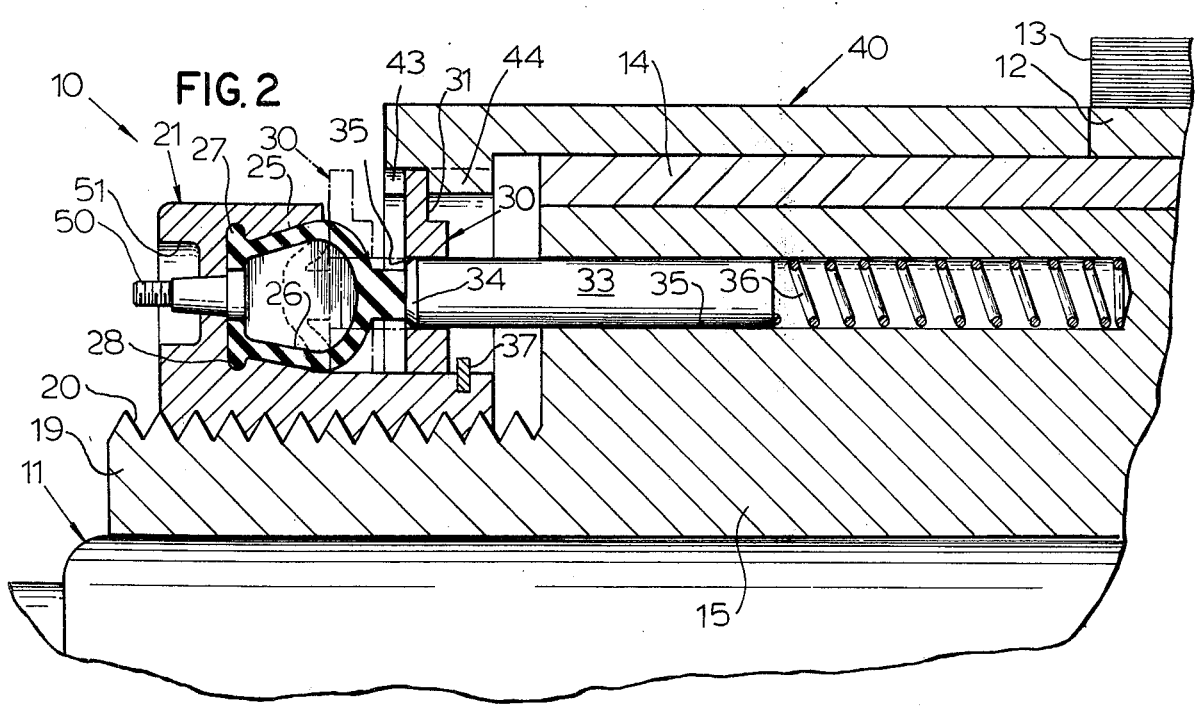
FIG. 2 is a fragmentary sectional side elevational view of the core clamping mechanism of FIG. 1 showing relative positioning of the locking disc during expansion and deflation of the elastomer tube.

An annular spacer sleeve 40 is generally as illustrated in FIG. 3, an axially extended ring having an inner hollow diameter greater than that of the outermost diameter of the hub 21 and regular diameter of the disc 30 to permit passage of the sleeve thereover and slightly greater than the shaft mandrel surface 14 to enable snug, slideable movement of the sleeve into abutting engagement with the free end of the core. The sleeves 16 and 40 may be formed with tang or notch means (not shown) permitting a locking engagement with corresponding edges of the core 12. The lead end of the sleeve, away from the core, is formed with radially inward extending divider surfaces 41 defining therebetween a plurality of spaces or recesses. The recesses are divided into two groups of first and second recesses, 42 and 43 respectively, each group corresponding to the size, shape, and number of the lugs 31 formed on the disc. The first recesses 42 are each open at opposed axial ends so as to be in the form of cut-out spaces in the sleeve. Accordingly, the sleeve can be passed over the hub and disc, with the disc lugs 31 being passed through the first recesses, and into the shaft mandrel surface 14 into trailing edge abutment with the lead edge of the core 12 as shown in FIGS. 1 and 2. After the sleeve has been assembled onto the winder shaft in this manner, the lead end of the sleeve is behind the locking disc 30.

The second recesses 43 are closed at rear ends thereof by means of back wall portions 44, integrally formed on the sleeve. After the sleeve has been placed on the shaft and in abutment with the core, it may be rotated by hand in either direction (a 45° turn as shown in FIG. 3) until the disc lugs 31 are in axial alignment with the recess spaces 43. Then, the disc lugs 31 may be fit into the sleeve with the second recess back walls serving as stops against the lugs 31 and the recess sidewall surfaces 41 serving to prevent rotational movement of the disc relative to the sleeve.

In preparation of the core clamp mechanism 10 gripping the core 12, the mechanism hub 21 is axially adjustable along the shaft spool to accommodate variations in core lengths, such that expansion of the tube will always provide a pressure force on the disc 30. Adjustment is made so that the disc does not engage against the annular stop means 37; i.e., the snap ring 37 is positioned rearward of the front face of the back walls 44 when the sleeve 40 is pressed against the core. A series of circumferentially spaced radial holes 45 may be formed in the hub in order to permit insertion of a manual turning tool, such as a bar, for axial movement of the hub along the threaded spool portion 20. To fix the hub against further movement on the spool away from a desired position, a lock screw 46 may be used to grip the threads 20. The clamp mechanism 10 may then be engaged to grip the core by pressure expansion of the tube into compressive contact against the front face surface of the disc, whereupon the disc lugs 31 engage with the sleeve stop walls 44 to hold the core in place against the back sleeve 16 and stop portion 17. If the core should shrink or axially compress, such as in the case of a fiber core, then the air pressure in the tube automatically accommodates such movement by axially expanding. Accordingly, the use of an air pressure locking force serves to provide constant grip pressure against the core and, in reaction, against the threads on the spool which minimizes tendency for the core clamp mechanism to loosen.

To remove the core, air pressure is relieved through the valve connection 50. The tube deflates and the biasing force of the springs 36 against the disc 30 serves to slide the disc forward along the hub bottom wall out from beneath the spacer sleeve 40, as shown in dotted line configuration in FIG. 2. The spacer sleeve is then rotated until the cutouts or first recesses 42 align with the lugs on the disc. The sleeve 40 is then axially pulled off the shaft spool, clearing the top of the hub as well as the regular outer diameter of the disc, and off the end of the shaft. To permit this operation, the shaft 11 may be mounted on a disconnect and swivel support means as those skilled in the art will appreciate. Upon removal of the sleeve from the shaft, the wound core may then be slid off the shaft and replaced with a fresh, empty core.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for clamping a hollow core on a rotatable shaft comprising:
    a hub member having attachment means for securing said hub member on said shaft,
    a hollow, resilient tube mounted on said hub member,
    means for inflating said tube with pressure,
    a sleeve means slideably received on said shaft for having one end abut with a free end of said core, and
    a locking means, positioned between said tube and sleeve means and having corresponding surfaces engageable with respective regions on said tube and sleeve means,
    whereby said tube, upon inflating, presses against said locking means to cause said sleeve means to grippingly engage said core.

2. The apparatus of claim 1, wherein said hub member has a bearing surface, said locking means comprising a disc axially slideable on said bearing surface.

3. The apparatus of claim 2, wherein said hub member and said disc are held by support means against rotational movement relative to said shaft.

4. The apparatus of claim 3, wherein said hub member attachment means afford axial adjustment of said hub member along said shaft.

5. The apparatus of claim 2, wherein
    said disc is formed with a series of circumferentially spaced raised surfaces and
    said sleeve means is an annular element having first and second sets of recess portions, each set corresponding to said raised surfaces,
    said first recess portions being axially open to permit passage of said sleeve over said disc for removal from said shaft,
    said second recess portions being axially closed to receive said raised surfaces in pressed engagement therewith.

6. The apparatus of claim 5, wherein said disc is spring biased towards said tube.

7. The apparatus of claim 1, wherein said tube is formed with a thickened region having a planar face for contacting said locking means.

8. Apparatus for winding and unwinding a traveling web comprising:
    a tubular core about which said web is wound,
    a shaft means for slideably receiving said core and adapted for rotation on an axis,
    stop means for receiving the trail end of said core and preventing axial movement of said core trail end therepast, and
    clamping means mounted to said shaft means for gripping the lead end of said core comprising
        a hub means having a pressure-expandable member which is axially movable upon inflation and
        a grip means extending between said pressure-expandable member and the lead end of said core, said grip means being axially movable and engageable by said pressure-expandable member.

9. The apparatus of claim 8, wherein
    said hub means defines an annular pocket for containing said pressure-expandable member therein and a bearing surface extending axially from said pocket and
    said grip means comprises a locking member mounted for slideable axial movement along said bearing surface and a sleeve member for receiving at one end said locking member is pressed engagement therewith and for abutting at the other end against the lead end of said core.

10. The apparatus of claim 9, wherein said hub means and said locking member are supported on said shaft means against relative rotation therewith.

11. The apparatus of claim 9, wherein said locking member is formed with relatively raised surfaces for engagement with said sleeve member, said sleeve member being formed with first and second sets of recesses, each set corresponding to said raised surfaces, the first set of recesses being axially open to permit said sleeve member to be passed over said locking member for removal from said shaft means and the second set of recesses being axially closed to receive said raised surfaces in pressed engagement therewith.

12. The apparatus of claim 11, wherein said locking member is spring-biased against said pressure-expandable member.

13. The apparatus of claim 9, wherein said hub means is secured to said shaft means for selective axial positioning therealong.

14. The apparatus of claim 8, wherein said pressure-expandable member comprises an annular tube and a valve communicating with the interior of said tube, said tube having a circular thickened face portion for contacting against said grip means upon inflation of said tube.

* * * * *

UNITED STATES PATENT AND TRADEMARK OFFICE
CERTIFICATE OF CORRECTION

PATENT NO. : 4,325,518
DATED : April 20, 1982
INVENTOR(S) : Gerald W. Karr & Robert E. Page It is certified that error appears in the above-identified patent and that said Letters Patent are hereby corrected as shown below:

Claim 9, 9th line, change "is" to --in--.

Signed and Sealed this

Sixth Day of July 1982

[SEAL]

Attest:

GERALD J. MOSSINGHOFF

Attesting Officer

Commissioner of Patents and Trademarks